United States Patent [19]
Tanaka et al.

[11] Patent Number: 5,548,725
[45] Date of Patent: Aug. 20, 1996

[54] SYSTEM FOR TRANSMITTING COMMAND AND/OR DATA IN A SINGLE PACKET AND AUTOMATICALLY REPORTING STATUS A PREDETERMINED TIME AFTER RECEIVING A COMMAND

[75] Inventors: Shigeo Tanaka, Tokyo; Hiroshi Yamazaki, Kanagawa; Noriko Kotabe, Chiba; Koichi Sugiyama, Kanagwa; Makoto Sato, Kanagawa; Akira Katsuyama, Kanagawa; Yoshio Osakabe, Kanagawa; Yasuo Kusagaya, Tokyo, all of Japan

[73] Assignee: Sony Corporation, Tokyo, Japan

[21] Appl. No.: 170,797

[22] Filed: Dec. 21, 1993

[30] Foreign Application Priority Data

Dec. 28, 1992 [JP] Japan .................................... 4-360171

[51] Int. Cl.⁶ ............................. G06F 11/00; G06F 11/26
[52] U.S. Cl. ................... 395/200.05; 395/290; 370/85.1; 364/132; 364/267.9
[58] Field of Search .......................... 395/200.01, 200.05, 395/290; 364/267.9, 132; 370/85.1

[56] References Cited

FOREIGN PATENT DOCUMENTS 0505006   9/1992   European Pat. Off. .

OTHER PUBLICATIONS

Mitchell, Ronald L., "Super Serial Systems", *Mini Micro Conference Record*, (May 1984).
Patent Abstracts of Japan, Publication No. JP5081736, Feb. 4, 1993 (Shigeo).

*Primary Examiner*—Thomas C. Lee
*Assistant Examiner*—Rehana Krick
*Attorney, Agent, or Firm*—Jay H. Maioli

[57] ABSTRACT

An audio visual control apparatus for communication between a master device and a slave device comprises a master AV center, at least one slave device, a digital control bus line and a transmitter. The master AV center has at least a display device and a communication processor. A minimum of one slave device is provided, having a communication processor connected to the master AV center via the digital control bus line between the two communication processors. The transmitter transmits one command and/or data in a single packet from the master AV center to the slave device and vice versa through the digital control bus line.

7 Claims, 20 Drawing Sheets

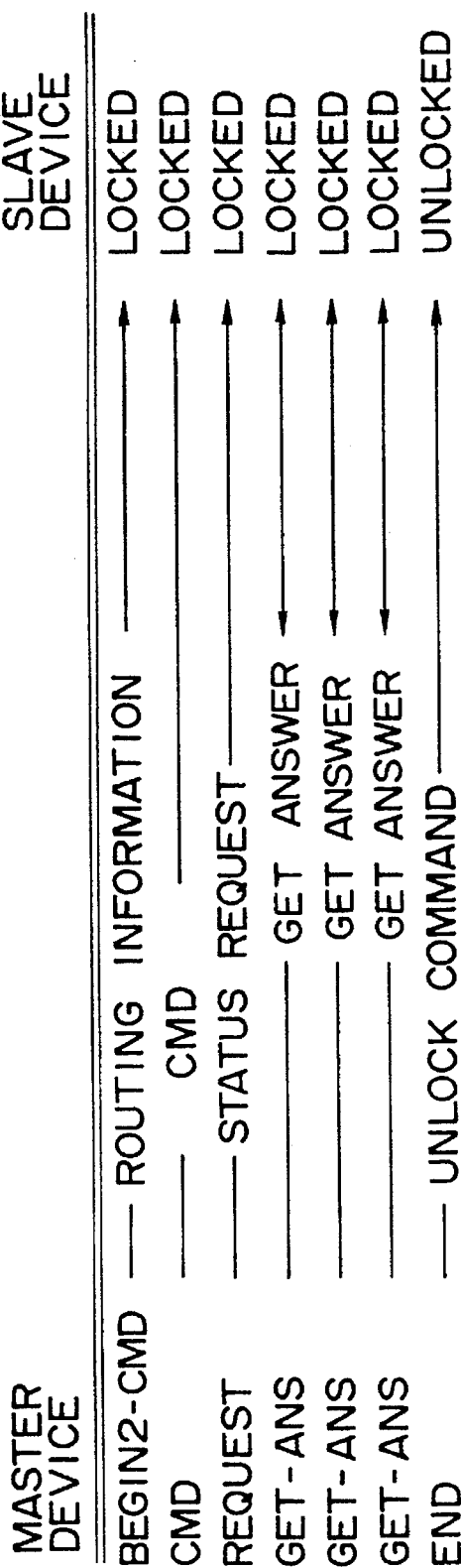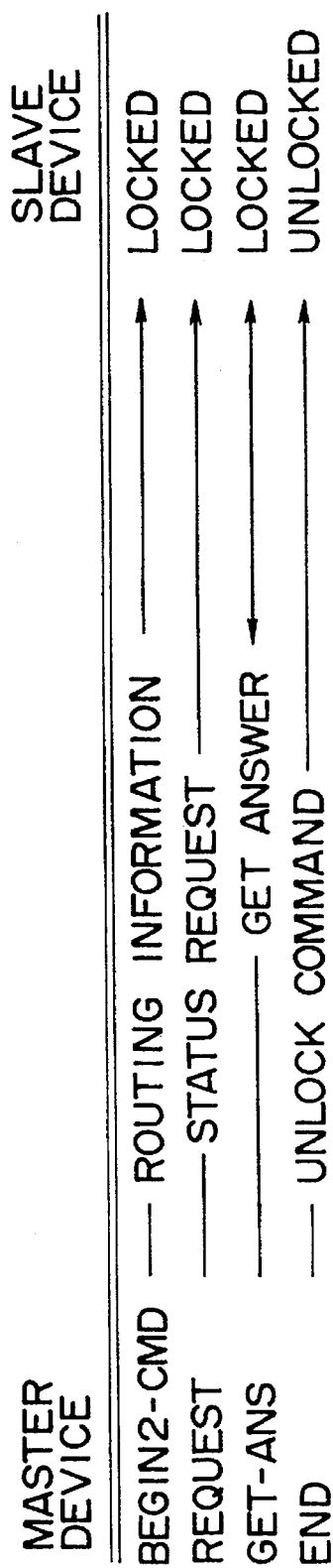

FIG. 3a PRIOR ART

| MASTER DEVICE | | SLAVE DEVICE |
|---|---|---|
| BEGIN2-CMD, CMD | ROUTING INFORMATION AND COMMAND | LOCKED |
| CMD | CMD | LOCKED |
| REQUEST | STATUS REQUEST | LOCKED |
| GET-ANS | GET ANSWER | LOCKED |
| END | UNLOCK COMMAND | UNLOCKED |

FIG. 3b PRIOR ART

| MASTER DEVICE | | SLAVE DEVICE |
|---|---|---|
| BEGIN2-CMD | ROUTING INFORMATION | LOCKED |
| CMD | CMD | LOCKED |
| REQUEST | STATUS REQUEST | LOCKED |
| GET-ANS | GET ANSWER | LOCKED |
| END | UNLOCK COMMAND | UNLOCKED |

FIG. 3c  PRIOR ART

| MASTER DEVICE | | SLAVE DEVICE |
|---|---|---|
| BEGIN2-CMD | ROUTING INFORMATION | LOCKED |
| CMD, CMD | PLURAL COMMANDS | LOCKED |
| REQUEST | STATUS REQUEST | LOCKED |
| GET-ANS | GET ANSWER | LOCKED |
| END | UNLOCK COMMAND | UNLOCKED |

FIG. 3d  PRIOR ART

| MASTER DEVICE | | SLAVE DEVICE |
|---|---|---|
| BEGIN2-CMD,CMD | ROUTING INFORMATION AND COMMAND | LOCKED |
| CMD | | LOCKED |
| DATA | DATA | LOCKED |
| REQUEST | STATUS REQUEST | LOCKED |
| GET-ANS | GET ANSWER | LOCKED |
| END | UNLOCK COMMAND | UNLOCKED |

ONLY INQUIRING ABOUT THE STATUS OF THE SLAVE DEVICE

TRANSMITTING A COMMAND TO THE SLAVE DEVICE AND RECEIVING THE RESULT OF COMMAND PROCESSING THEREFROM

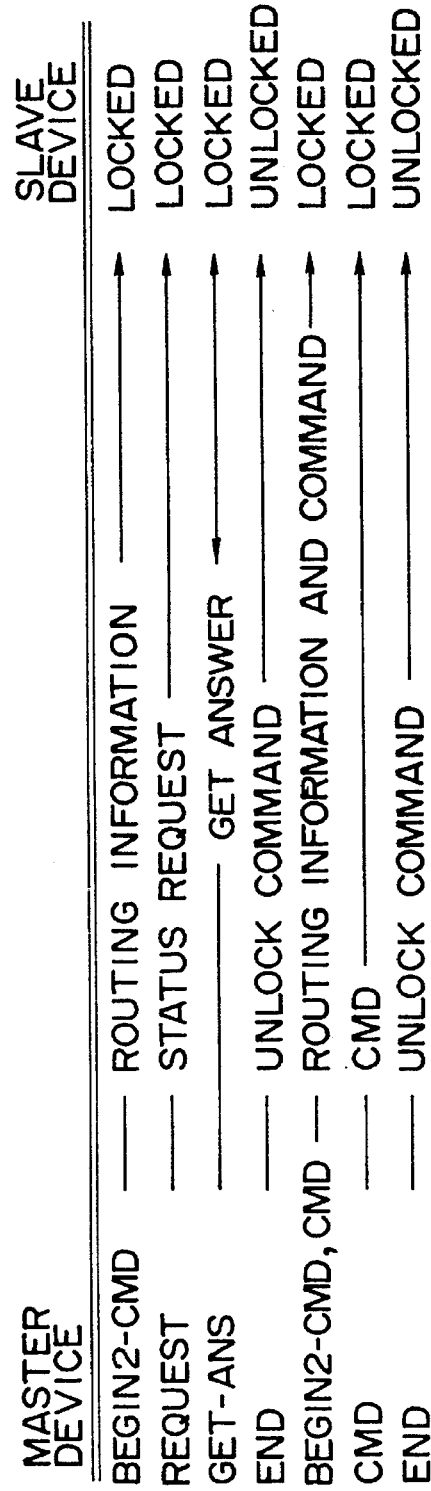
FIG. 4c PRIOR ART — TRANSMITTING TO THE SLAVE DEVICE A STATUS REQUEST FOLLOWED BY A COMMAND IF THE REQUEST IS ACKNOWLEDGED

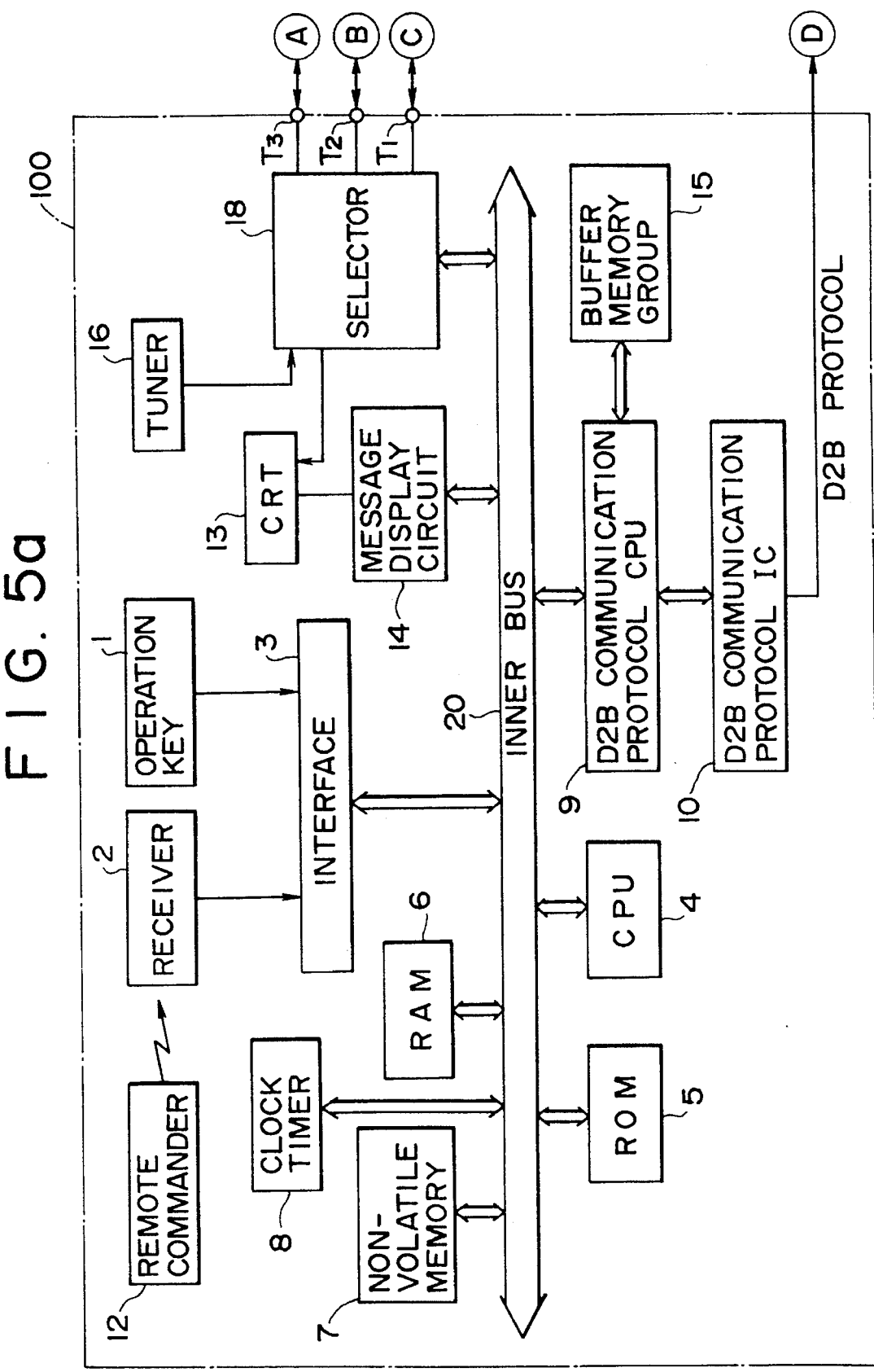

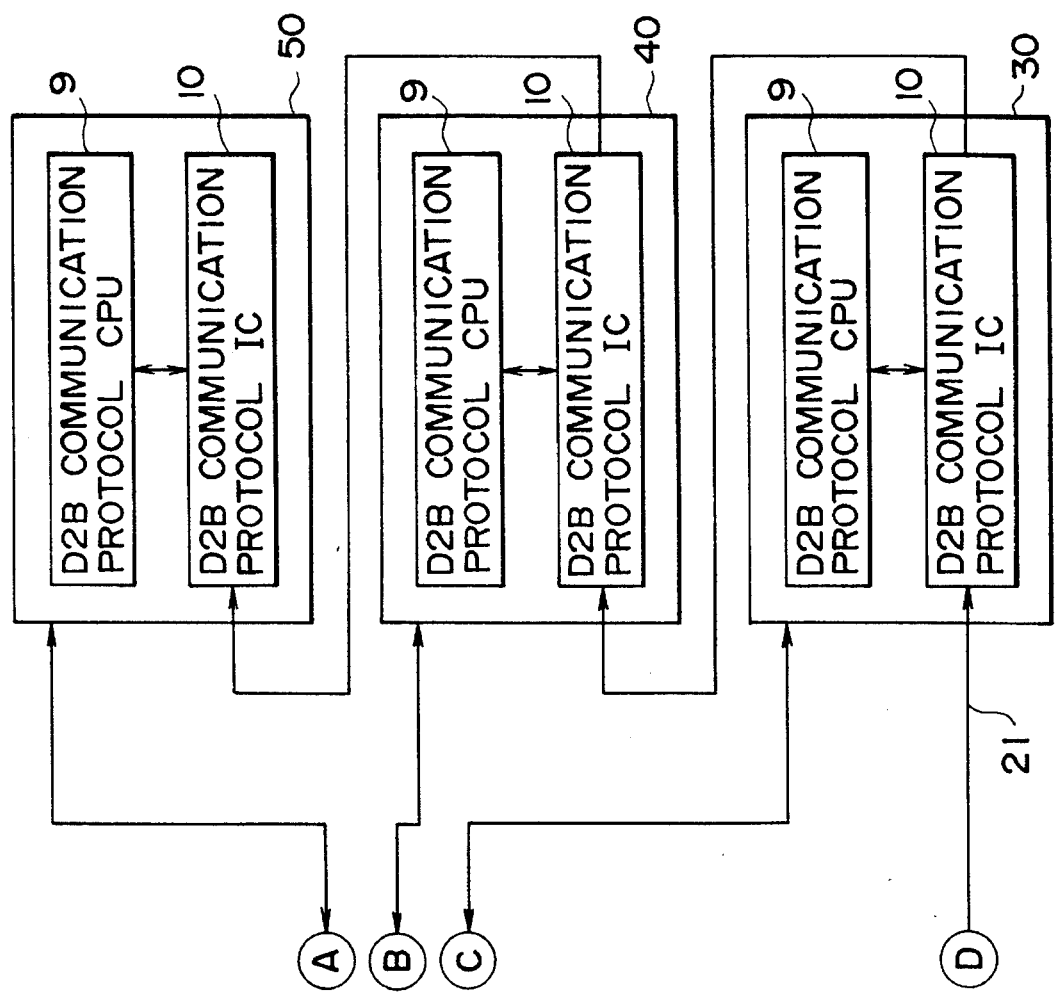

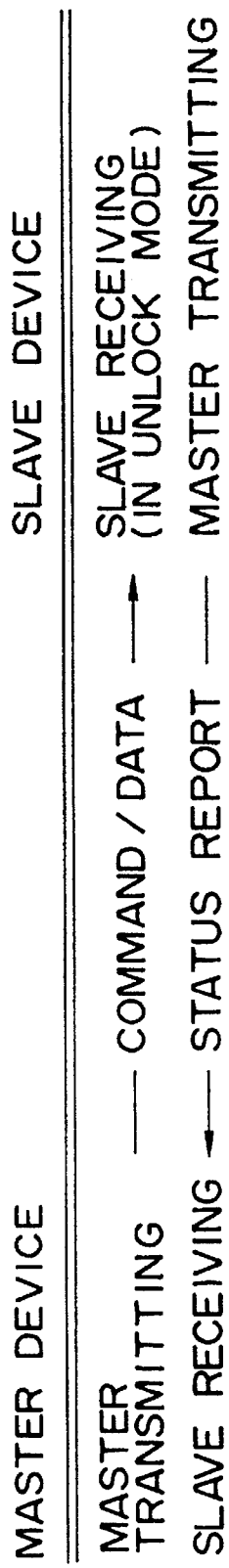
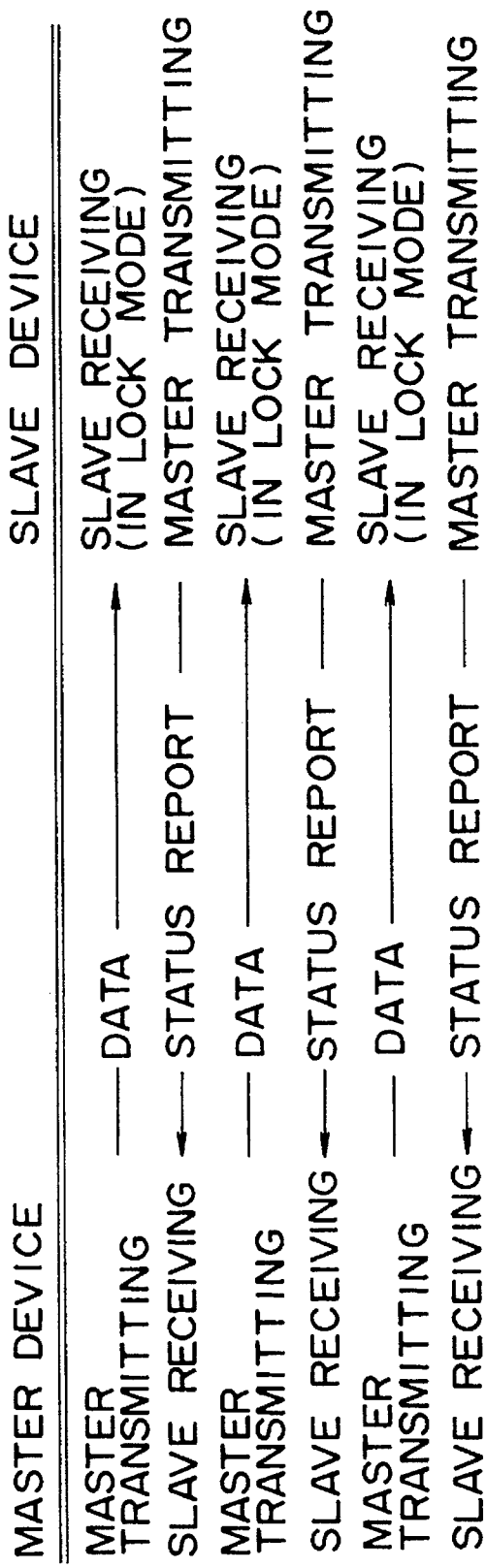
FIG. 7
FIG. 8

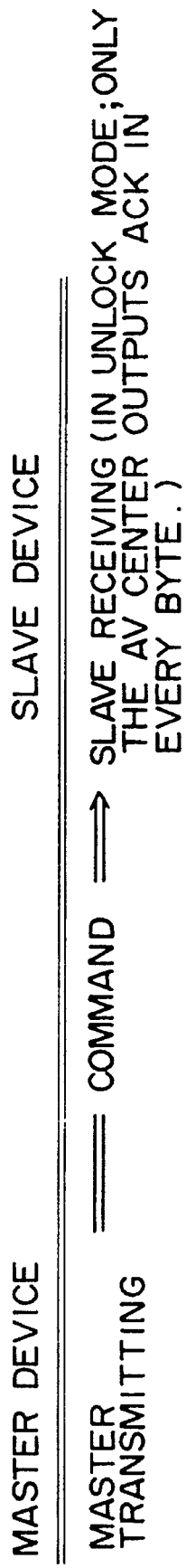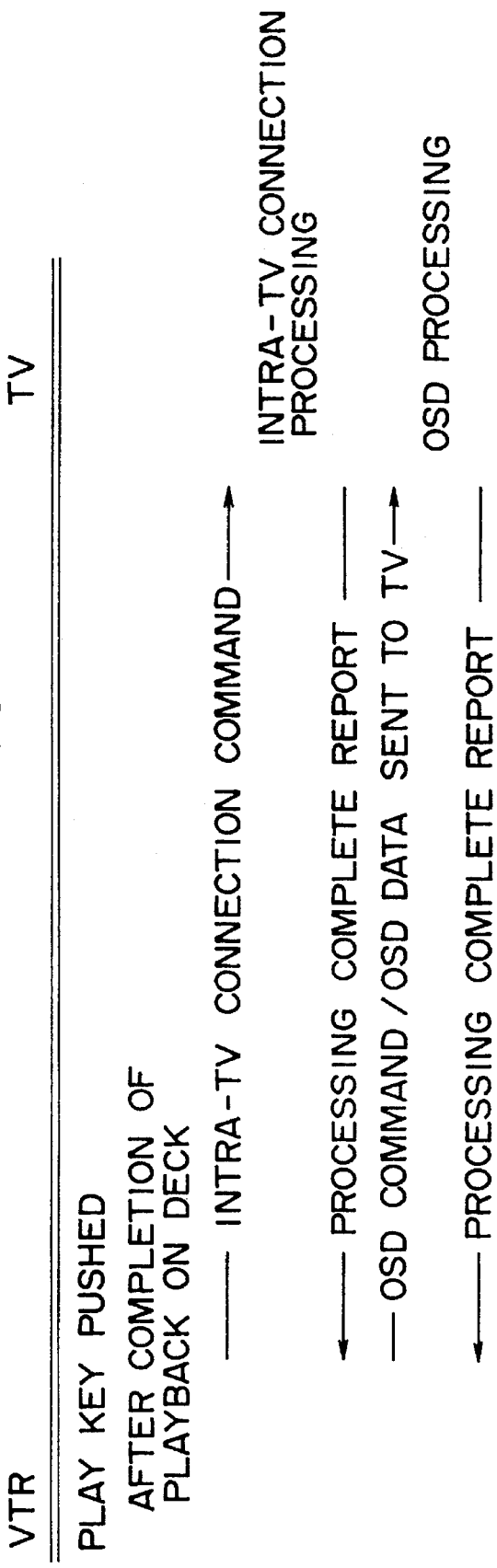

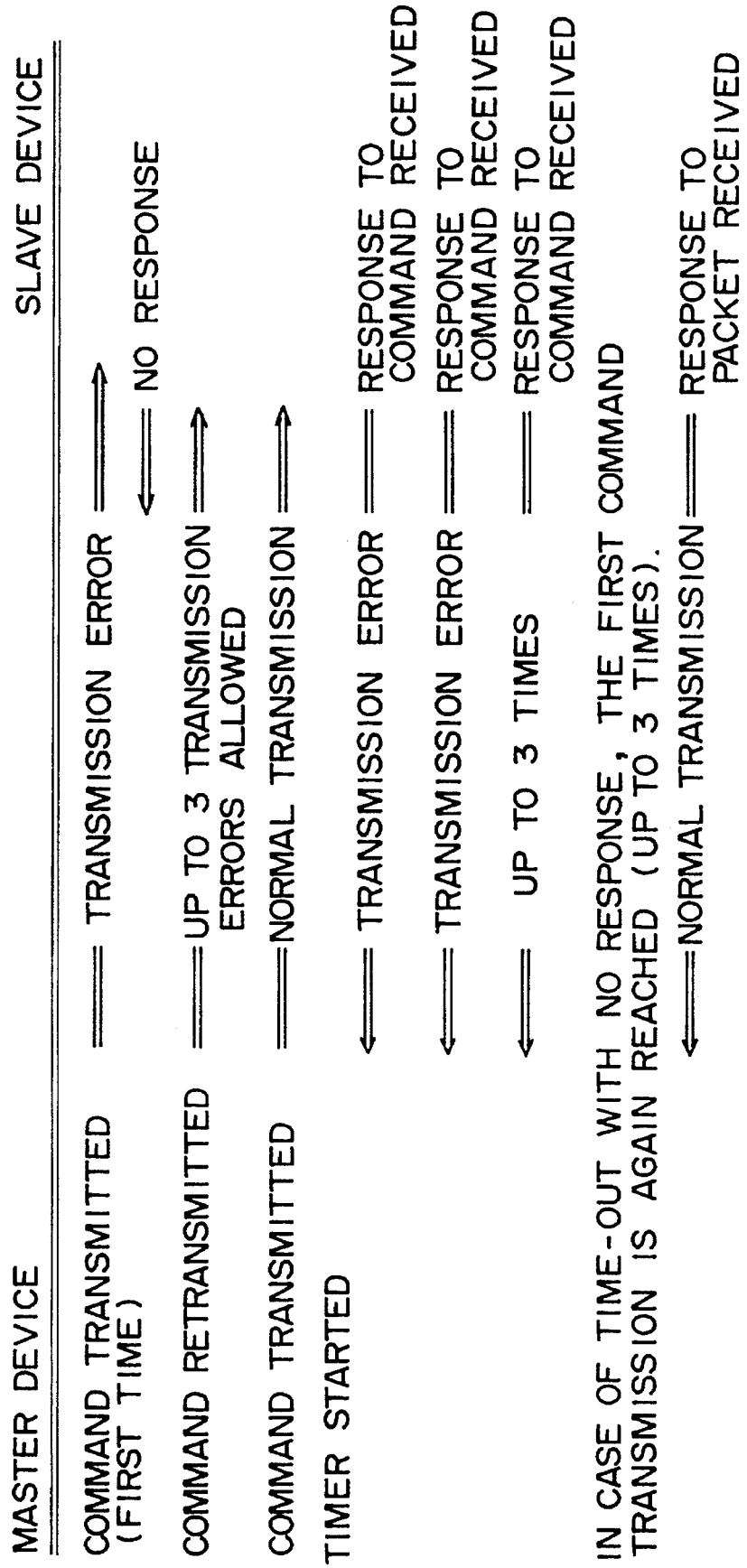

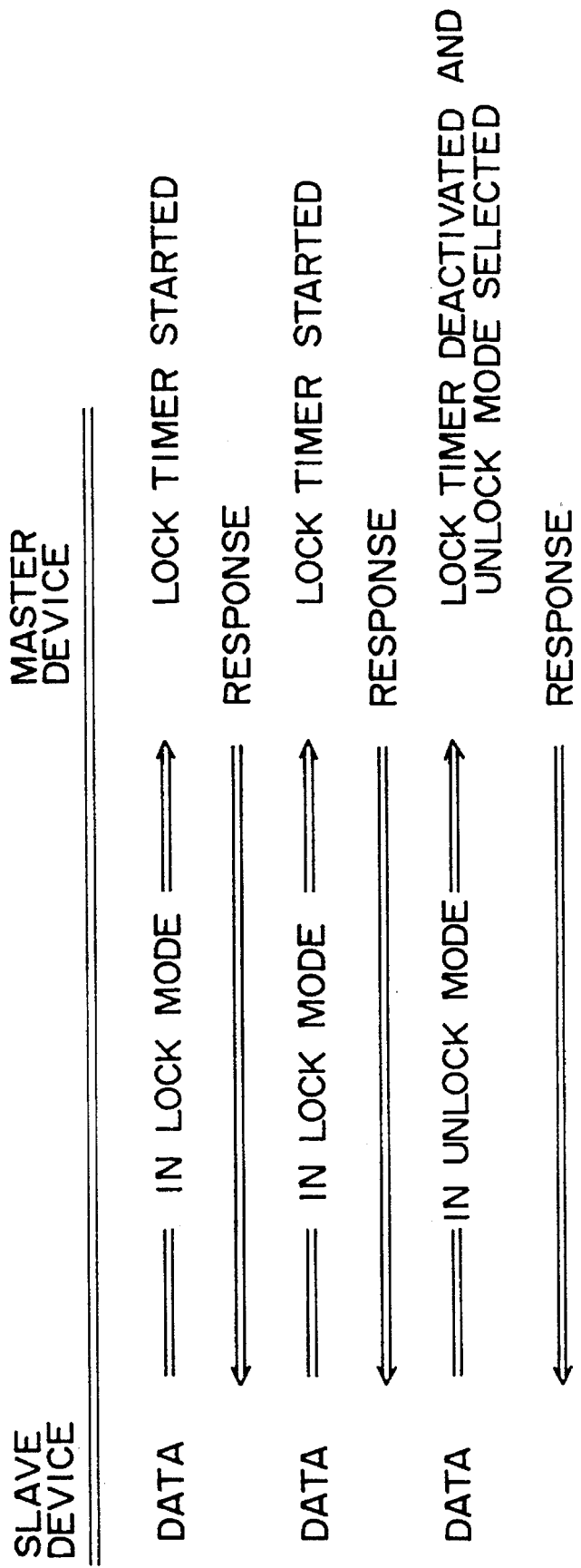

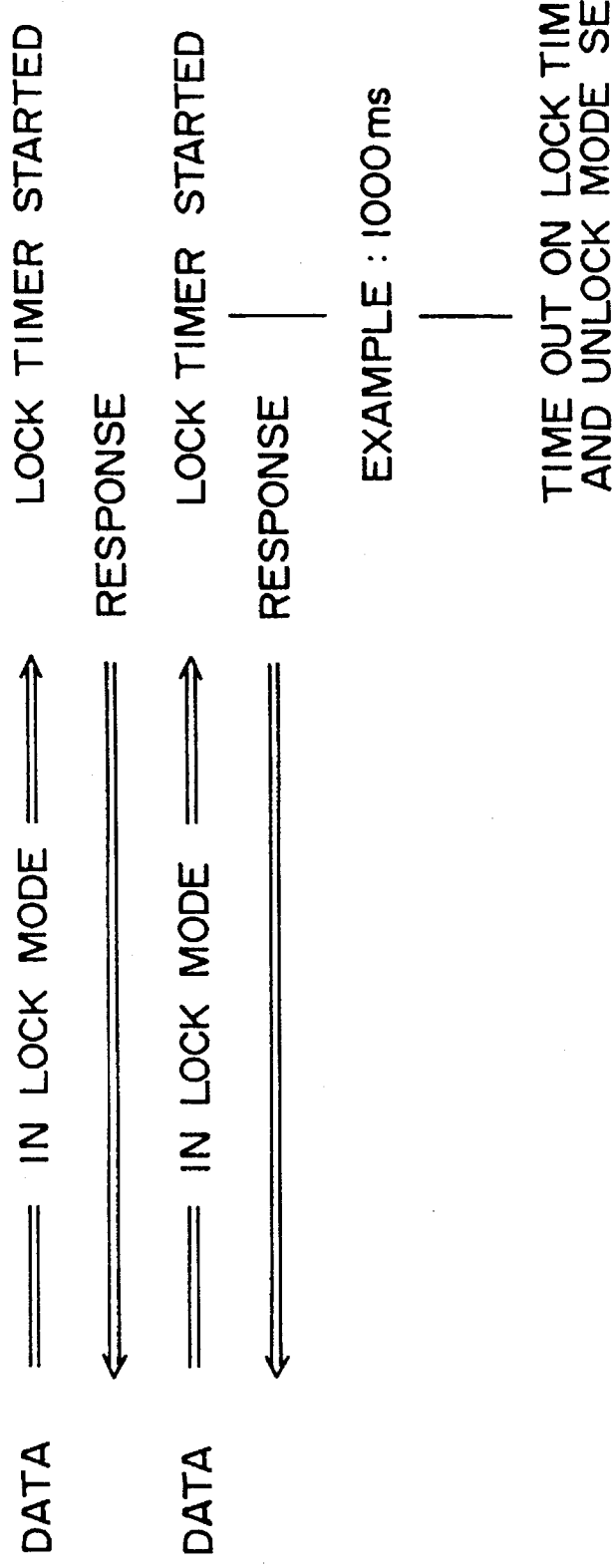

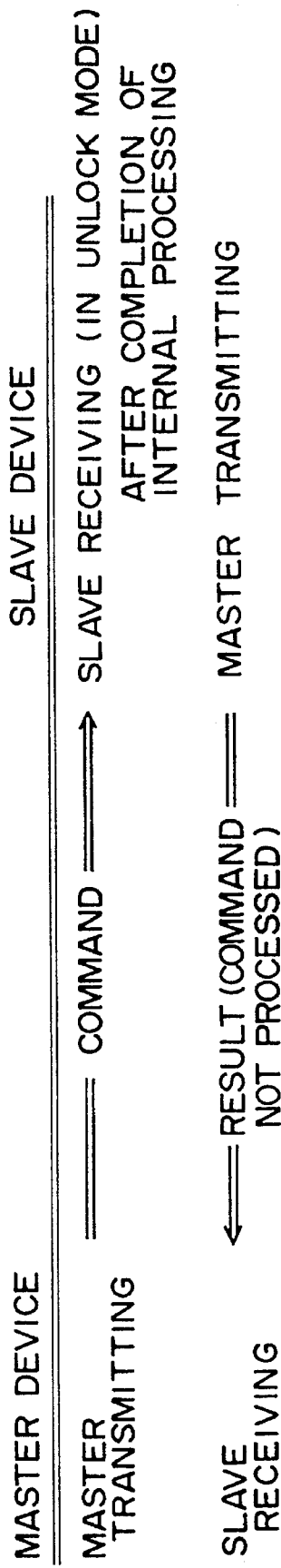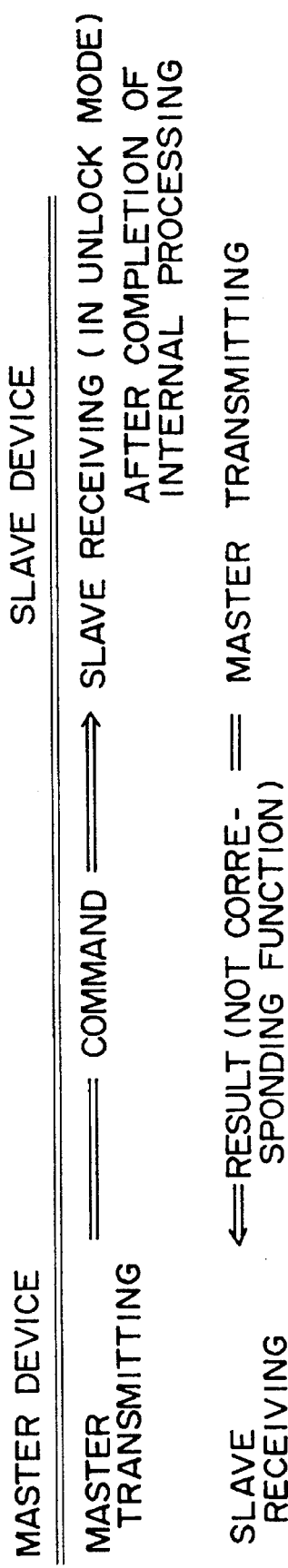

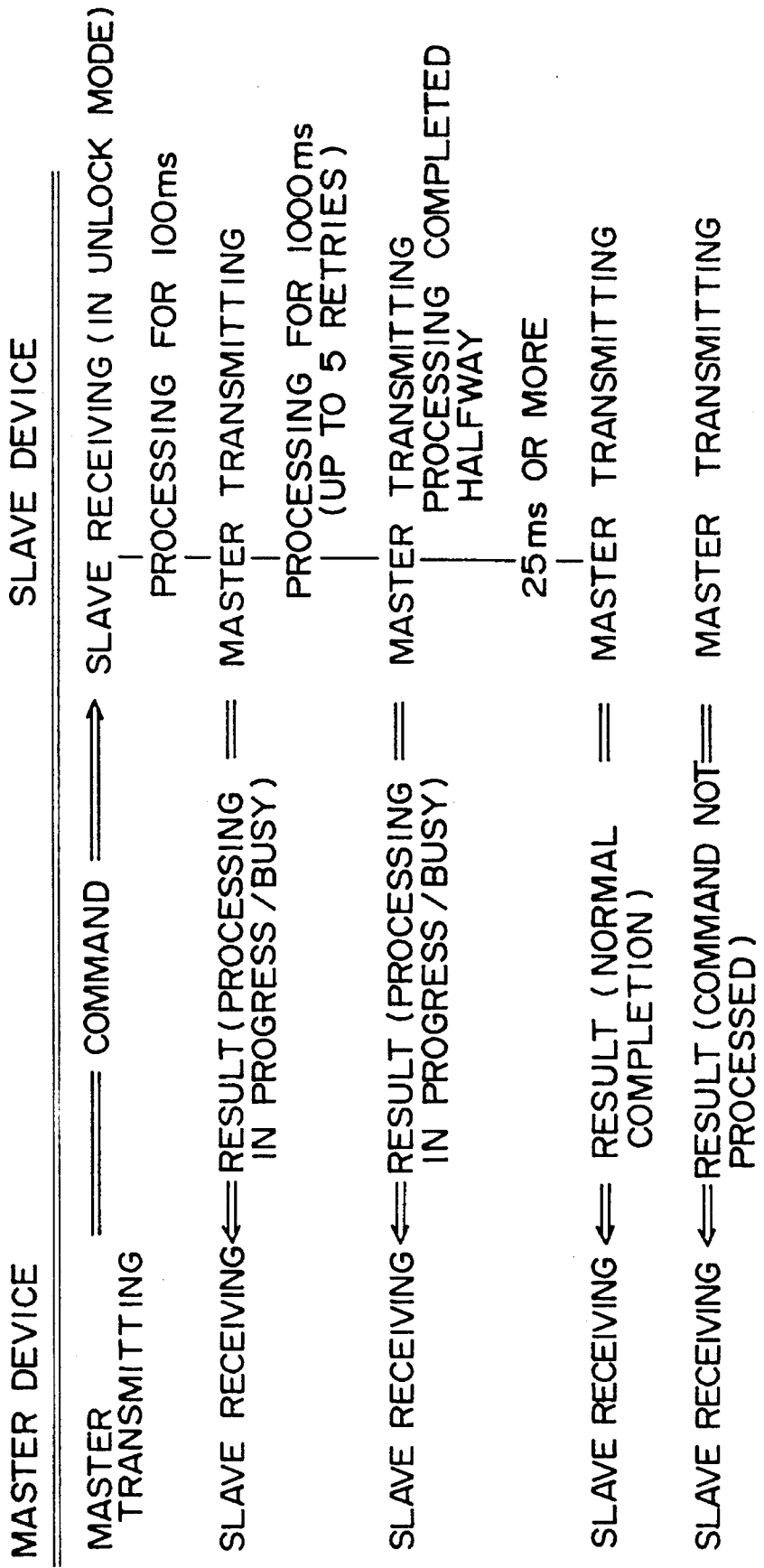

SYSTEM FOR TRANSMITTING COMMAND AND/OR DATA IN A SINGLE PACKET AND AUTOMATICALLY REPORTING STATUS A PREDETERMINED TIME AFTER RECEIVING A COMMAND

BACKGROUND OF THE INVENTION

1. Field of the Invention

The present invention relates to a method and an apparatus of communication for use with audio visual (AV) systems.

2. Description of the Related Art

Conventional methods of communication between audio visual components basically involve having a master device transmit commands (CMD) to a slave device and then request from the latter the result of command processing thereby, as shown in FIG. 1. Thus if the slave device does not terminate its signal processing for some reason, the master device has to ask for a response with a certain period of time. The impasse keeps the bus occupied. In addition, the master and slave devices must have a master and a slave transmission buffer, respectively, and a master reception (GET-ANS) buffer and a slave reception buffer for the purpose of communication therebetween.

FIG. 2 shows a conventional communication method whereby a master device requests the status of a slave device. FIGS. 3a through 3d depict conventional communication methods whereby the master device transmits commands (CMD) to the slave device and requests from the latter the result of command processing. As illustrated, where commands are to be transmitted, there is no fixed transmission sequence for transmitting the packets. This requires the microcomputer program for communication processing to deal flexibly with diverse procedures of communication. This leads to a relatively large number of program steps required, making program preparation inordinately difficult.

FIGS. 4a through 4c show typical methods of communication under the conventional D2B (digital data bus) communication protocol. As depicted, it requires five packets to send a command to a slave device and to request therefrom the result of command processing (GET-ANS). It then takes seven packets to send a command to the slave device, to request the result of command processing therefrom, and to transmit another command thereto if the request is normally acknowledged. When transmitted, the packets carry not only the data that needs to be sent but also the mode involved, the address of the slave device, the address of the transmitting device, and the type of each transmitted packet. The higher the number of packets needed to accommodate such information, the slower the communication speed.

With the conventional communication methods of FIGS. 4a through 4c, an "END" command packet is used to unlock the slave device. That is, one more packet is needed in addition to those dealing with the processing in question. To transmit the "END" command requires actually transmitting as many as 47 bits because the packet head data such as an address also needs to be sent. A locked slave device means one that accepts only locked communication data packets from its master device and rejects the command packets from any other device. To unlock the slave device requires receiving unlock communication data from the master device that the slave device is locked onto. Once unlocked, the slave device may receive data from any device.

SUMMARY OF THE INVENTION

It is therefore an object of the present invention to overcome the above and other deficiencies and disadvantages of the related art and to provide a method and an apparatus of communication which is easy to use and which offers higher communication speeds.

It is another object of the invention to provide a method and an apparatus of communication for allowing the master device to determine the status of the slave device without specifically requesting the status thereof.

It is a further object of the invention to provide a method and an apparatus of communication whereby the slave device has no need for a lock timer while receiving data packets.

In carrying out the invention and according to one aspect thereof, there is provided an audio visual control apparatus for communication between a master device and a slave device, comprising: master AV center means having at least a display device and communication processing means; at least one slave device having communication processing means connected to the master AV center by way of a digital control bus line between the two communication processing means; and transmission means for transmitting one command and/or data in a single packet from the master AV center means to the slave device and vice versa through the digital control bus line.

In a preferred structure according to the invention, the transmission of the command by the transmission means is performed in unlock mode of the communication processing means.

In another preferred structure according to the invention, the communication processing means of the receiving device transmits a status report to the transmitting device after the command and/or data is received.

In a further preferred structure according to the invention, the transmission of the command and/or data is performed using a plurality of packets, and all packets except the last packet are transmitted in lock mode and the last packet is transmitted in unlock mode.

According to another aspect of the invention, there is provided a method for transmitting a command and/or data between AV appliances, the method comprising the steps of: transmitting a command and/or data from an AV appliance to another AV appliance using a single packet; and transmitting a status report from the receiving AV appliance to the transmitting AV appliance.

As outlined, the invention allows one packet to carry one command. This simplifies the handling of the commands being transmitted and enhances the transmission speed involved. If processing does not terminate within a predetermined time after receipt of a command, the receiving device automatically sends a status report to the transmitting device. This eliminates the need for the transmitting device specifically to request the status of the receiving device. With commands always transmitted in unlock mode, there is no need for the receiving device to incorporate an unlock timer for command reception. Where data is transmitted using a plurality of packets, all packets except the last packet are transmitted in lock mode and the last packet is transmitted in unlock mode. Thus the receiving device need not have a lock timer activated for all packets while they are being transmitted.

These and other objects, features and advantages of the invention will become more apparent upon a reading of the following description and appended drawings.

BRIEF DESCRIPTION OF THE DRAWINGS

FIG. 1 shows a conventional communication method whereby a master device transmits a command (CMD) to a slave device and requests the status thereof;

FIG. 2 shows a conventional communication method whereby a master device requests only the status of a slave device;

FIGS. 3a through 3d shows a conventional communication method whereby a master device transmits a command(s) to a slave device and then requests the status thereof;

FIGS. 4a through 4c shows a variety of conventional communication methods under the D2B communication protocol;

FIG. 5a and 5b are a block diagram of an AV system to which the invention is applied;

FIG. 7 illustrates how a command is transmitted according to the invention;

FIG. 8 illustrates how data is transmitted according to the invention;

FIG. 12 illustrates a typical plural communication setup according to the invention;

FIG. 13 shows a typical flow of communication data in effect when a push-to-play feature is executed according to the invention;

FIG. 16 shows a typical flow of communication data in effect when a transmission error is detected according to the invention;

FIG. 17a shows a case where a plurality of data packets (frames) are received in lock mode and the last data packet is received in unlock mode. FIG. 17b shows a case where the last data packet remains unreceived;

FIGS. 18a through 18c show cases where packets are received normally but the processing is not terminated normally according to the invention;

DESCRIPTION OF THE PREFERRED EMBODIMENT

Figure 4A:
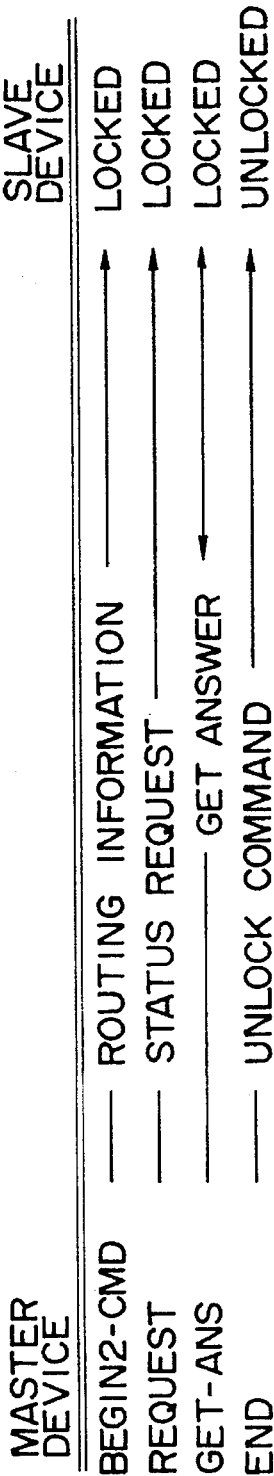
Figure 4B:
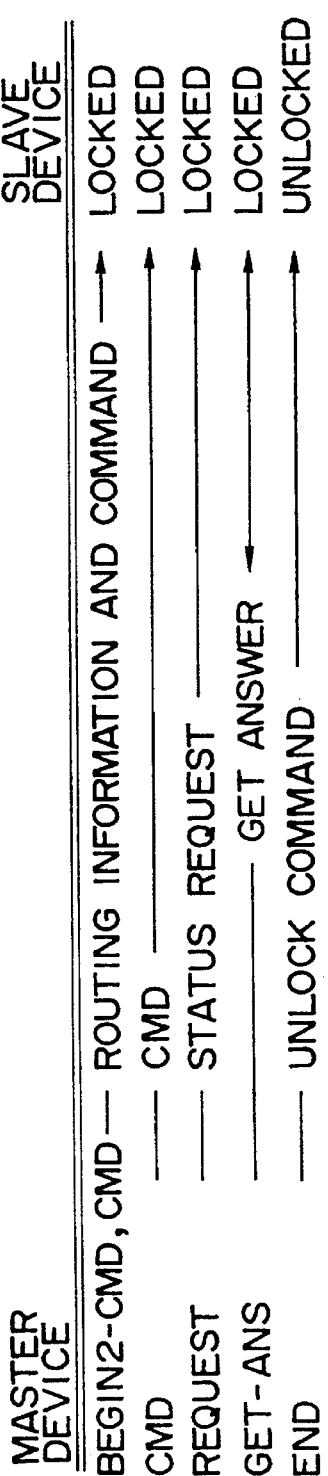

FIG. 5 is a block diagram of a typical audio visual (AV) system to which the invention is applied. In FIG. 5, pushing an operation key 1 enters a command into a CPU (central processing unit) 4 via an interface 3. Likewise, operating a remote commander 12 triggers infrared ray emissions therefrom for reception by a receiver 2. On receipt of the infrared rays emitted, the receiver 2 also enters a command into the CPU 4 via the interface 3.

On processing the command thus entered, the CPU 4 outputs a channel selection command to a tuner 16 or sends a command to a D2B (digital data bus) communication protocol CPU 9 via an inner bus 20. (Although the inner bus 20 also connects the CPU 4 with the tuner 16, this connection is not shown in FIG. 5 for visual simplicity.) A ROM (read only memory) 5 stores programs needed for the CPU 4 to operate. A RAM (random access memory) 6 stores data obtained from the processing of the CPU 4. A non-volatile memory 7 accommodates data needed to be retained after power is removed, such as the system configuration involving other AV appliances (e.g., a first VTR (video tape recorder) 30, a second VTR 40 and an LDP (laser disc player) 50). A clock timer 8 mediates timing by generating clock information. The CPU 4, ROM 5, RAM 6 and the clock timer 8 constitute a main microcomputer of a TV set.

The D2B communication protocol CPU 9 is connected to the CPU 4 via the inner bus 20. The CPU 9 is further connected to other AV appliances such as the first VTR 30, second VTR 40 and LDP 50 by way of a D2B communication protocol IC (integrated circuit) 10 and a D2B bus (D2B communication line) 21. Data and commands are exchanged between the CPU 9 and the appliances connected thereto. A ROM and a RAM for use by the D2B communication protocol CPU 9 are furnished but are not shown.

The D2B Communication Protocol CPU 9 is connected to a buffer memory group 15. Upon receipt of data, the CPU 9 selects from among the buffer memories 15 the buffer memory appropriate to that data and stores the data therein. For example, if a header (comprising routing information, or source-to-destination information) is received, it is stored into a header buffer. Likewise, a command (CMD) upon receipt is placed into a command buffer, OSD (on-screen display) data into an OSD data buffer, and a request (REQ) into a request buffer. The CPU 9 stores the response to a request into a response buffer. The buffer memory group 15 may be implemented in part of the RAM for the CPU 9.

The first VTR 30 is connected to a terminal T1 of a selector 18 via an AV signal line 31. Video and audio signals are exchanged between the first VTR 30 and the selector 18. The second VTR 40 is connected to a terminal T2 of the selector 18 via an AV signal line 41. Video and audio signals are exchanged likewise between the second VTR 40 and the selector 18. The LDP 50 is connected to a terminal T3 of the selector 18 via an AV signal line 51, exchanging video and audio signals with the selector. The video and audio signals to be output by the selector 18 are determined by the CPU 4 or by the CPU 9.

A CRT (cathode ray tube) 13 displays video images represented by the video signal output from the selector 18. Given On Screen Display (OSD) data from the CPU 9 over the inner bus 20, a message display circuit 14 displays the data as a message in a predetermined area on the CRT 13. The audio signal output by the selector 18 is reproduced by a speaker, not shown.

As shown in FIG. 5, there is provided a TV center 100 comprising the operation key 1, receiver 2, interface 3, CPU 4, ROM 5, RAM 6, non-volatile memory 7, clock timer 8, D2B communication protocol CPU 9, D2B communication protocol IC 10, CRT 13, message display circuit 14, tuner 16, selector 18, and speaker (not shown).

The first VTR 30, the second VTR 40 and the LDP 50 each have a D2B communication protocol CPU and a buffer group corresponding respectively to the D2B communication protocol CPU 9 and buffer memory group 15 of the AV center 100. These components exchange headers, commands, requests and OSD data via the D2B control line 21. Illustratively, in the setup of FIG. 5, the VTR 30, VTR 40 and LDP 50 each incorporate the D2B communication protocol CPU 9 and the D2B communication protocol IC 10.

They also include the buffer 15 each, which is not shown in FIG. 5.

The master device, to be described later, will be any one of the AV center 100, the first VTR 30, the second VTR 40 and the LDP 50. The slave device is to be any one of the rest of these appliances.

Figure 6:
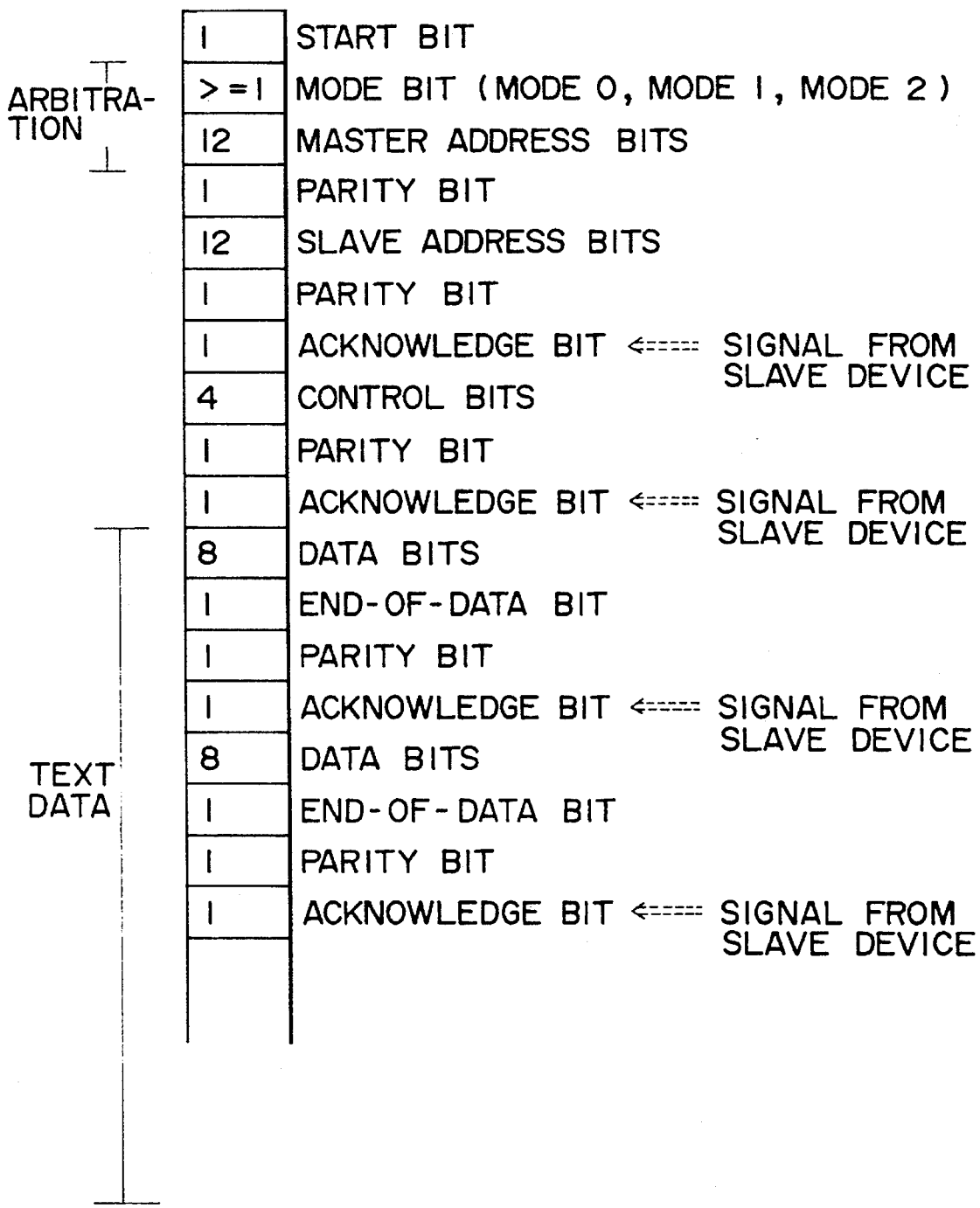
FIG. 6 is an example of typical communication packet-format data transmitted over a D2B bus 21 in FIG. 5.

FIG. 6 shows typical communication packet-format data transmitted over the D2B bus 21 in FIG. 5. In FIG. 6, master address bits represent the address of the transmitting device; slave address bits denote the address of the receiving device; an acknowledge bit provides an acknowledge (ACK) signal/not-acknowledge (NAK) signal in each byte sent from the receiving device to the transmitting device; and control bits designate the type of a packet and lock or unlock mode thereof. In mode 1, the maximum length of text data is 32 bytes.

FIG. 7 depicts how a command is transmitted illustratively according to the invention. In this example, one command/data batch is transmitted in a single packet from the master device to the slave device. The command/data batch is transmitted in unlock mode. Upon receipt of the command/data, the slave device returns a status report in master transmission mode.

FIG. 8 shows how data is transmitted illustratively according to the invention. To transmit OSD data or other data in a plurality of packets (frames) requires that the master device first lock the communication capability of the slave device (i.e., destination) using the first packet so that the slave device will reject signals from any other device. More specifically, the control bits representing "F" (hexadecimal) for data transmission in unlock mode are changed to "B" (hexadecimal) in each of the packets carrying the data in lock mode. In the last packet, the control bits are set again to "F"H to designate unlock mode. The possibility of packets in unlock mode failing to arrive while the slave device is being locked is avoided illustratively by use of a lock timer. This lock timer may be activated when a first packet in lock mode is received. If no packet is received, say, one second after the slave device is locked, the lock timer will cause the slave device to be unlocked.

Figure 9:
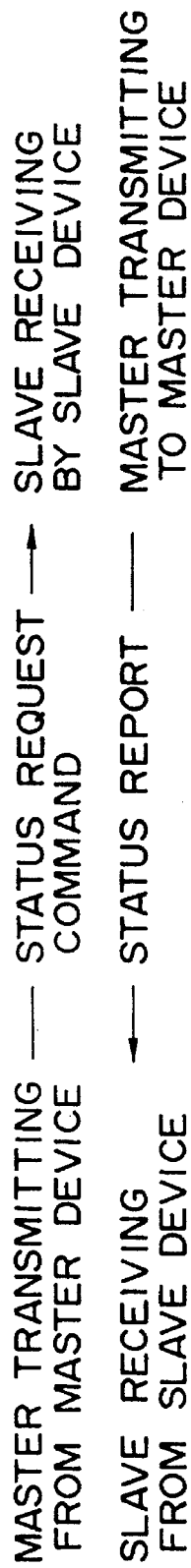
FIG. 9 illustrates how a status request command is responded to with a status report according to the invention.

FIG. 9 indicates how a status request command is responded to with a status report according to the invention. In this example, the master device first transmits a status request command to the slave device. In response, the slave device returns a status report to the master device in master transmission mode.

Figure 10:
FIG. 10 shows how a status report is automatically transmitted according to the invention.

FIG. 10 portrays how a status report is automatically transmitted according to the invention. A slave devices, for example, the VTR 30, VTR 40 or LDP 50 in FIG. 5, reports any change in its status automatically to the AV center 100 whenever the change occurs. The AV center 100 need not issue additional status request commands. With fewer signals to be transmitted over the bus 21, the efficiency of communication is improved.

Figure 11:
FIG. 11 shows how a status report is automatically transmitted in a plural communication setup according to the invention.

FIG. 11 outlines how a status report is automatically transmitted in a multiple device communication setup according to the invention. In this setup, the signal from the master device is received by a plurality of slave devices. FIG. 12 illustrates a typical plural communication setup according to the invention. Where two or more devices require precisely timed processing, the master device using its communication capability may transmit timing information to these devices. This makes it possible to carry out a precisely synchronized feature such as dubbing. In a one-to-one communication setup, the receiving device always returns a bit level acknowledge signal (ACK) or not-acknowledge signal (NAK) to the transmitting device, whereas in the multiple device communication setup, only the AV center 100 transmits the bit level ACK or NAK. At the time that the ACK or NAK signal is to be transmitted, the devices other than the AV center 100 must not transmit a "1" or "0" but must remain in an open state. Illustratively, upon elapse of 25 ms after reception of a not-acknowledge signal (NAK) in each byte from a slave device in the multiple device communication setup, the master device may transmit to that slave device a command in unlock mode telling it not to send ACK in each byte. That command may be transmitted in up to three retries.

FIG. 13 shows a typical flow of communication data in effect when a push-to-play function is executed according to the invention. In this example, when playback is carried out by operation of a PLAY key of a VTR, the VTR transmits a connection command to the AV center. After completion of internal connection processing, the AV center reports the completion to the VTR. The VTR then transmits OSD command/OSD data to the AV center. When the OSD processing is completed, the AV center notifies the VTR of the completion of the processing.

Figure 14:
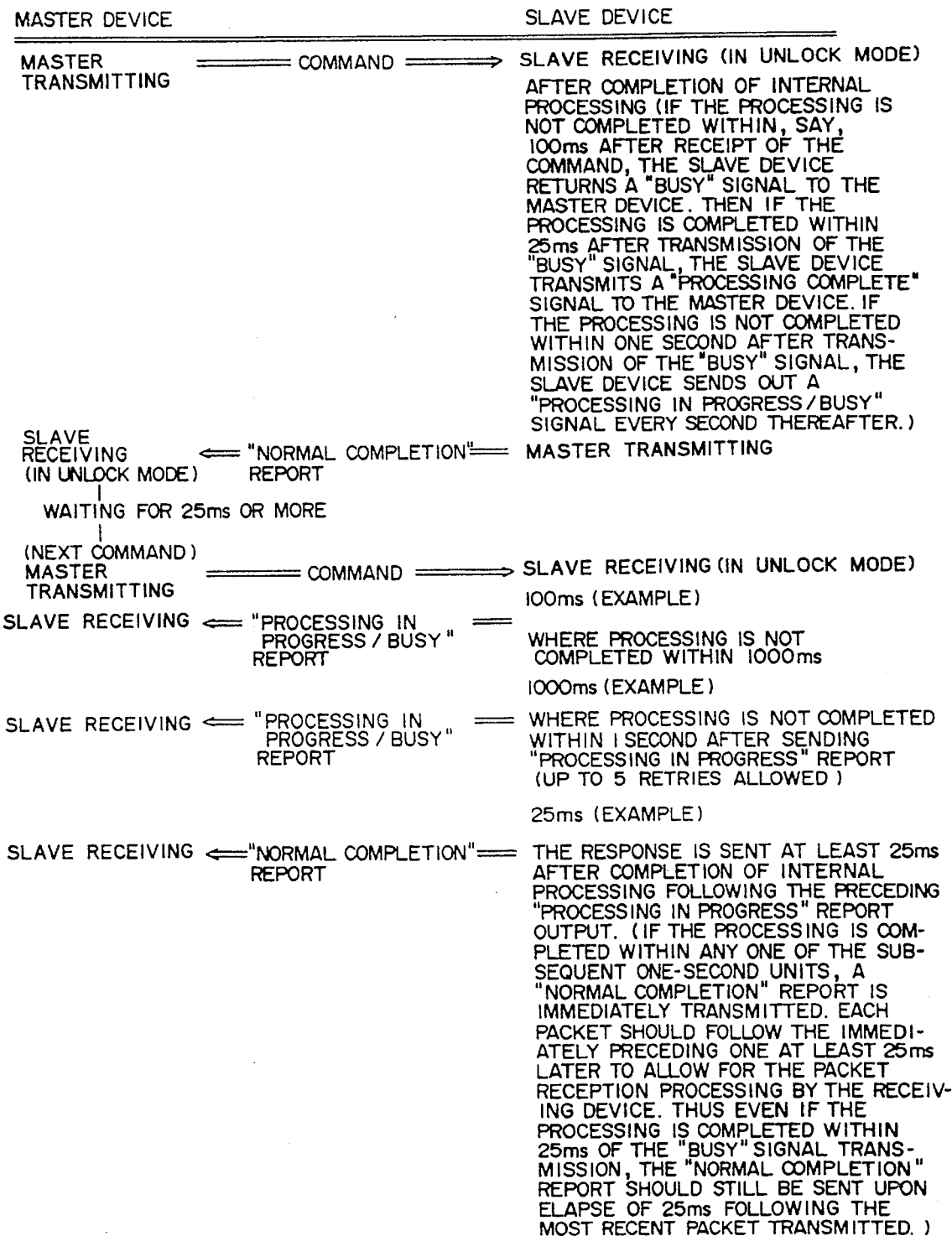
FIG. 14 depicts a typical flow of communication data in effect when the communication is normally terminated according to the invention.

FIG. 14 depicts a typical flow of communication data in effect when the communication is normally terminated according to the invention. A slave device, having received a command from the master device, processes the command internally. After normally completing the command processing, the slave device notifies the AV center of the normal completion. If the processing is not completed within, say, 100 ms after receipt of the command, the slave device returns a "busy" signal to the master device. Then if the processing is completed within 25 ms after transmission of the "busy" signal, the slave device transmits a "processing complete" signal to the master device. If the processing is not completed within one second after transmission of the "busy" signal, the slave device sends out a "processing in progress/busy" signal every second thereafter. In this manner, the slave device reports the status it is in to the master device even if the processing is not completed within a predetermined time after receipt of a command. This allows the master device to monitor the status of the slave device accurately without transmitting a status request command thereto. The above-mentioned predetermined periods of time (100 ms, 25 ms, 1 second) are cited only for illustrative purposes; any other appropriate time periods may be adopted as needed.

Figure 15:
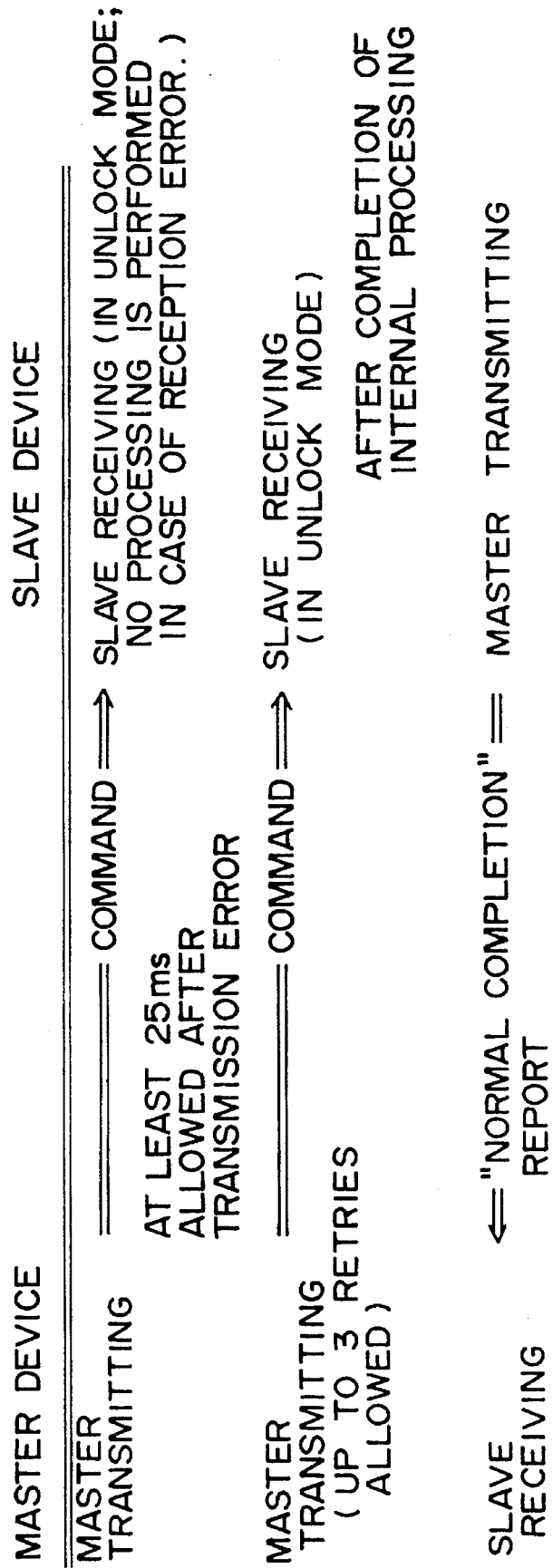
FIG. 15 shows a typical flow of communication data in effect when a packet is not transmitted or received normally according to the invention.

FIG. 15 indicates a typical flow of communication data in effect when a packet is not transmitted or received normally according to the invention. In this example, the master device has received a not-acknowledge (NAK) signal in a packet from a slave device which is supposed to transmit ACK or NAK in every byte to the master device. The slave device performs no processing when transmitting the NAK signal, i.e., in case of a reception error. Upon receipt of the NAK signal, i.e., in case of a transmission error, the master device again transmits the same command 25 ms later.

FIG. 16 outlines a typical flow of communication data in effect when a transmission error is detected according to the invention. If the master device transmits a command and fails to receive a response from the slave device within a predetermined period of time (e.g., 100 ms), the master device retransmits the same command up to three times. The reasons for not receiving the response from the slave device include a reception error in which the response from the slave device has failed to arrive, a slave device failure preventing the transmission of a response, and a meaningless response received from the slave device.

FIG. 17a shows a case where a plurality of data packets (frames) are received in lock mode and the last data packet is received in unlock mode (normal case). FIG. 17b portrays a case where the last data packet remains unreceived (abnormal case). If the last data packet is not received in unlock mode, the lock timer is started to select unlock mode upon elapse of, say, 1 second.

FIGS. 18a through 18c depict cases where packets are received normally but the processing is not terminated normally according to the invention. In the example of FIG. 18a, the slave device received a command but is unable to process that command. In the example of FIG. 18b, the slave device received a command but has no corresponding function to process that command. In the example of FIG. 18c, the slave device received a command but has failed to complete the processing of the command within a predetermined period of time.

Figure 19:
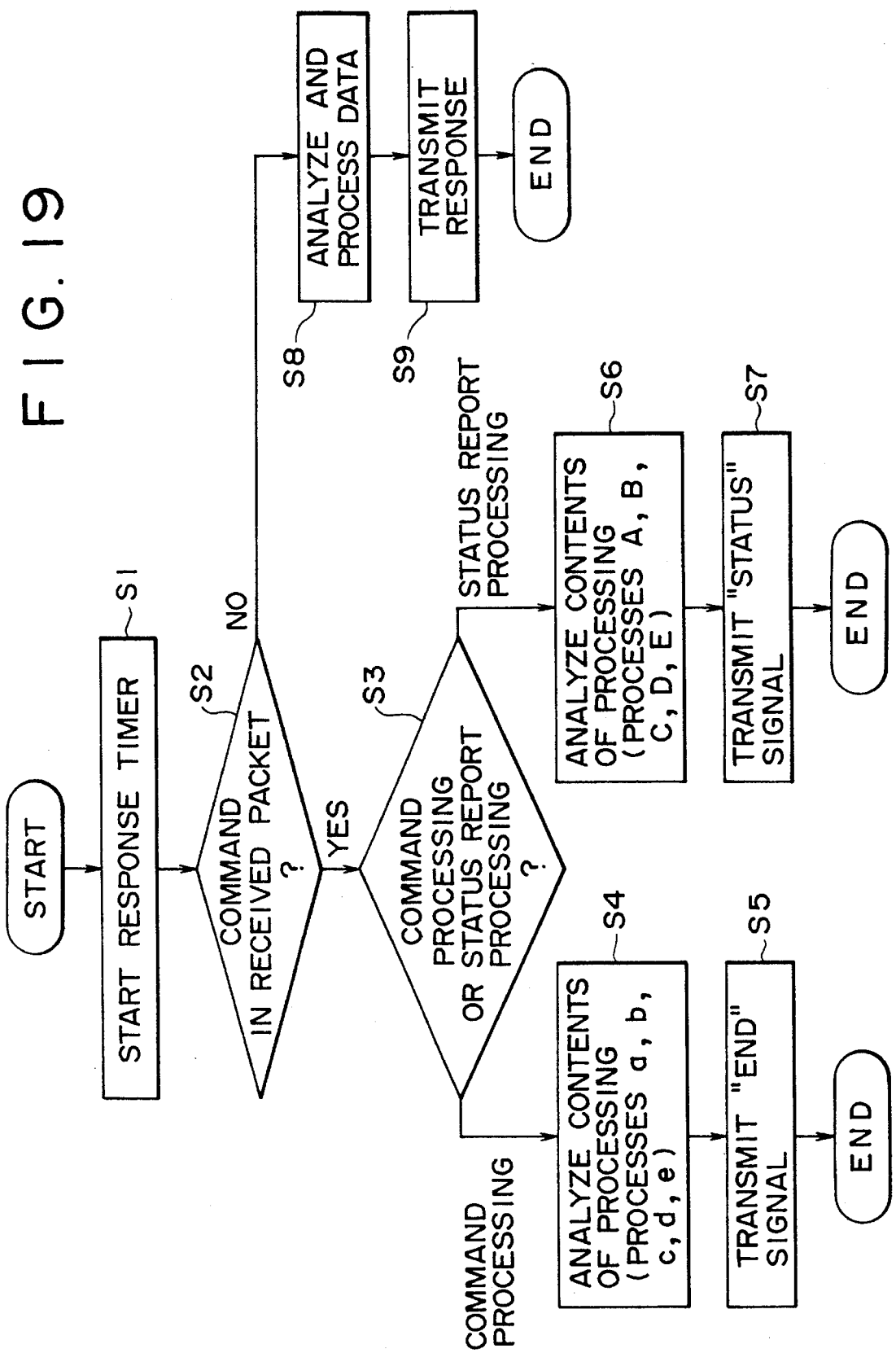
FIG. 19 is a flowchart of steps for receiving packets according to the invention.

FIG. 19 is a flowchart of typical steps for receiving packets according to the invention. When a packet has arrived, the D2B communication protocol CPU 9 in FIG. 5 first gets a response timer (for a preset time of, say, 100 ms) started (in step S1). The CPU 9 then checks to see if the received packet contains a command or data (step S2). If the packet contains a command, the CPU 9 checks to see whether command processing or status report processing is to be performed (step S3). If command processing is selected, the command is analyzed and the necessary processes are carried out (step S4). Upon completion of the command processing, an "end" signal is transmitted to the master device (step S5). If status report processing is selected, the command is analyzed and the necessary processes are carried out. Upon completion of the analysis and processing, a "status" signal is transmitted to the master device (step S7). If the packet is found to contain data in step S2, step S8 is reached. In step S8, the processing necessary for the data is analyzed and performed accordingly. The completion of the processing is then reported to the master device (step S9), which terminates the whole packet reception processing.

Figure 20:
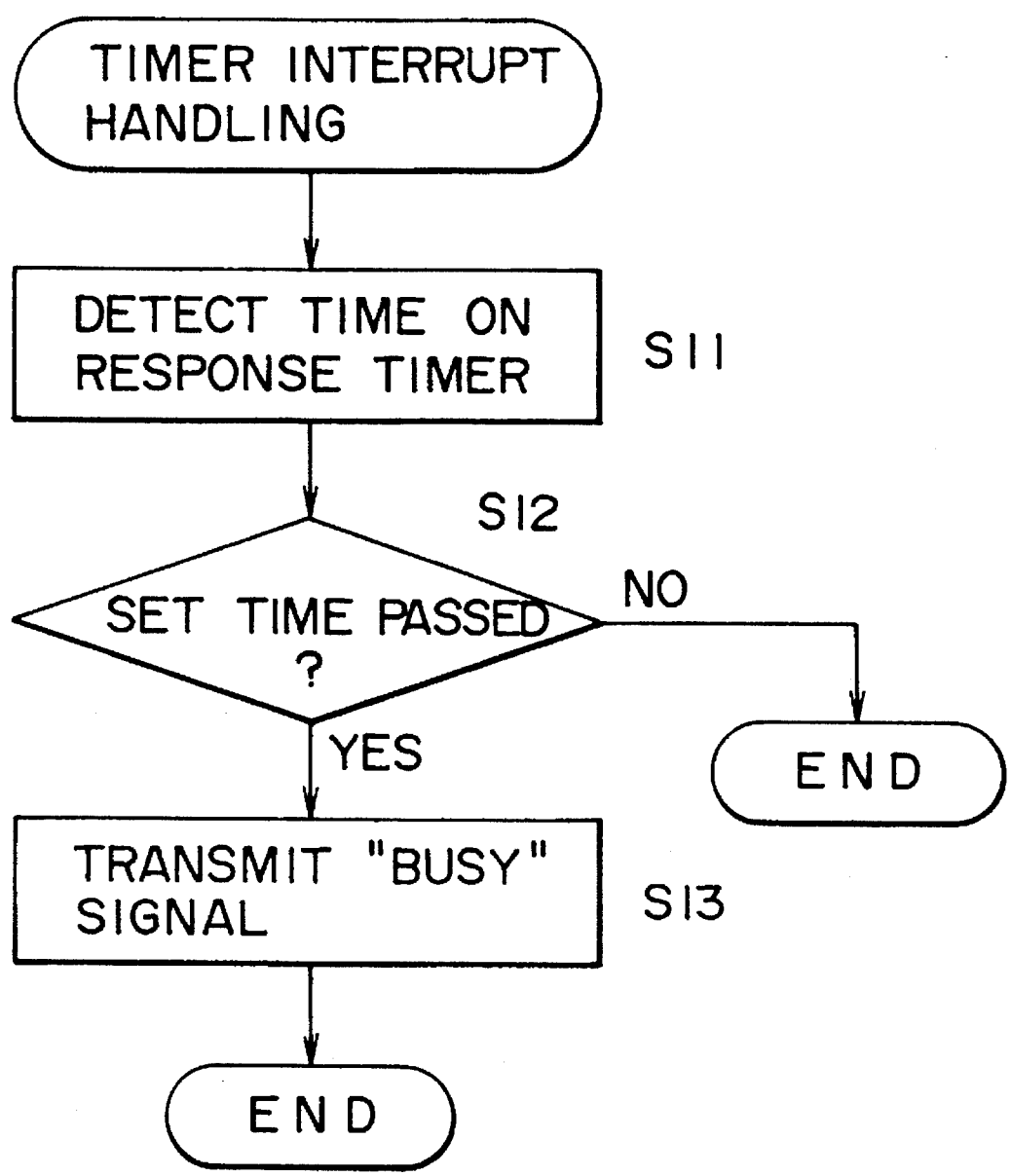
FIG. 20 is a flowchart of steps for carrying out timer interrupt handling according to the invention.

FIG. 20 is a flowchart of typical steps for carrying out timer interrupt handling according to the invention. The D2B Communication Protocol CPU 9 first detects the time set on the response timer (step S11). If the set time is found to have elapsed ("YES" in step S12), a "busy" signal is transmitted.

Although the examples above center primarily on the bus protocol between devices, the invention may also be applied to communications between block modules within an appliance.

As described and according to the invention, each command is always transmitted in a single packet. This simplifies the handling of the commands being transmitted and enhances the transmission speed involved.

According to the invention, if processing does not terminate within a predetermined time after receipt of a command, the slave device automatically transmits a status report to the master device. This allows the master device to monitor the status of the slave device precisely without specifically requesting the status report from the slave device.

In addition, where data is transmitted using a plurality of packets, all packets except the last packet are transmitted in lock mode and the last packet is transmitted in unlock mode. Thus the slave device need not have the lock timer activated for all packets while they are being transmitted.

As many apparently different embodiments of this invention may be made without departing from the spirit and scope thereof, it is to be understood that the invention is not limited to the specific embodiments thereof except as defined in the appended claims.

What is claimed is:

1. An audio visual control apparatus for communication between a plurality of devices, comprising:

a master device having first communication processing means for processing command and data to be transmitted by said master device;

at least one slave device having second communication processing means for processing command and data received by said slave device and for generating a status report to be transmitted by said slave device to said master device a predetermined time after said slave device receives a command from said master device, said status report describing a status of a processing of said command from said master device by said second communication processing means, and said slave device being connected to said master device by way of a digital control bus line between said first communication processing means and said second communication processing means;

wherein said second communication processing means does not generate a status report if said processing of said command from said master device is completed by said second communication processing means prior to said predetermined time after said command is received;

first transmission means for transmitting command and/or data to be transmitted by said master device to said slave device, each command transmitted from said master device to said slave device being in a single packet; and second transmission means for transmitting said status report from said slave device to said master device through said digital control bus line.

2. An audio visual control apparatus as cited in claim 1, wherein transmission of said command by said first transmission means is performed with an unlock mode.

3. An audio visual control apparatus as cited in claim 1, wherein transmission of said command and/or data by said first transmission means is performed in master transmission mode.

4. An audio visual control apparatus as cited in claim 1, wherein transmission of data is performed using a plurality of packets, and wherein all packets except the last packet are transmitted in a lock mode and the last packet is transmitted in an unlock mode.

5. A method for transmitting a command and/or data between AV appliances, the method comprising the steps of:

transmitting a command and/or data from a transmitting AV appliance to a receiving AV appliance, the command being transmitted in a single packet;

generating and transmitting a status report from the receiving AV appliance to the transmitting AV appliance within a predetermined time after the receiving AV appliance receives the command, the status report being a description of a status of a processing of the command; and not generating a status report if processing is completed prior to said predetermined time after said command is received.

6. A method for transmitting a command and/or data between AV appliances as cited in claim 5, wherein transmission of said command is executed in an unlock mode.

7. A method for transmitting a command and/or data between AV appliances as cited in claim 5, wherein, when data is transmitted using a plurality of packets, all packets carrying the data except the last packet are transmitted in a lock mode and the last packet is transmitted in an unlock mode.

* * * * *